DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 75

T943,006

DYNAMIC PRIORITY QUEUEING MECHANISM METHOD AND MEANS

Leonard F. Giaccone and Luther J. Woodrum, Poughkeepsie, N.Y., assignors to International Business Machines Corporation, Armonk, N.Y.

Continuation of abandoned application Ser. No. 363,680, May 24, 1973. This application Aug. 16, 1974, Ser. No. 497,975

**Int. Cl. G06f *7/06***

U.S. Cl. 444—1

8 Sheets Drawing. 64 Pages of Specification

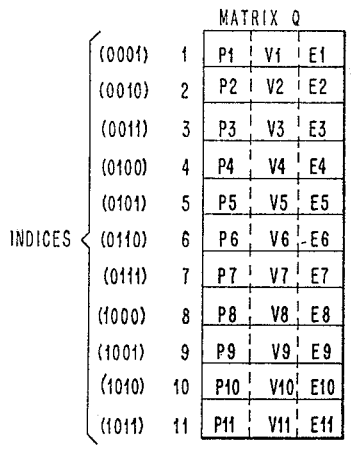

Electronically inserting a queue element with any queue service value into a queue having a unique binary tree structure, and/or removing from the queue its element currently having the lowest (highest) service value in the queue. The queue elements are inserted as vertices of a binary tree structure in which the queue is ordered by the service values of its elements. Each queue element has fields which contain its queue service value V, a path order bit P, and either the item being queued by the queue element or a pointer to the item.

Figures 1C, 1D, 1E:
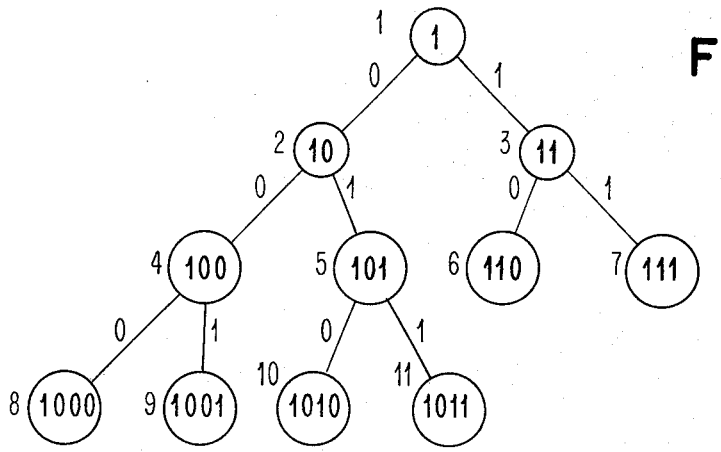
Figure 3:
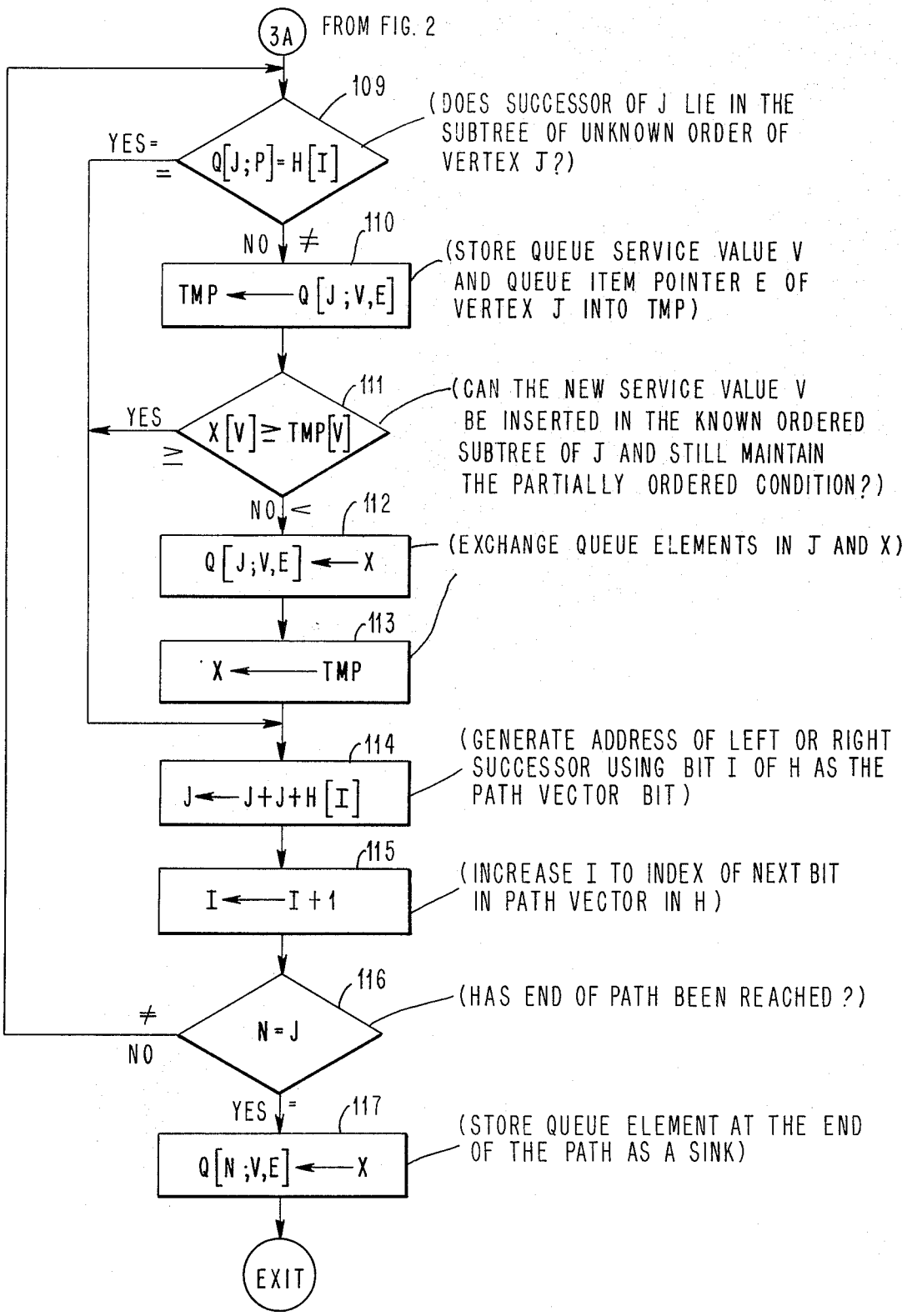
Figure 4:
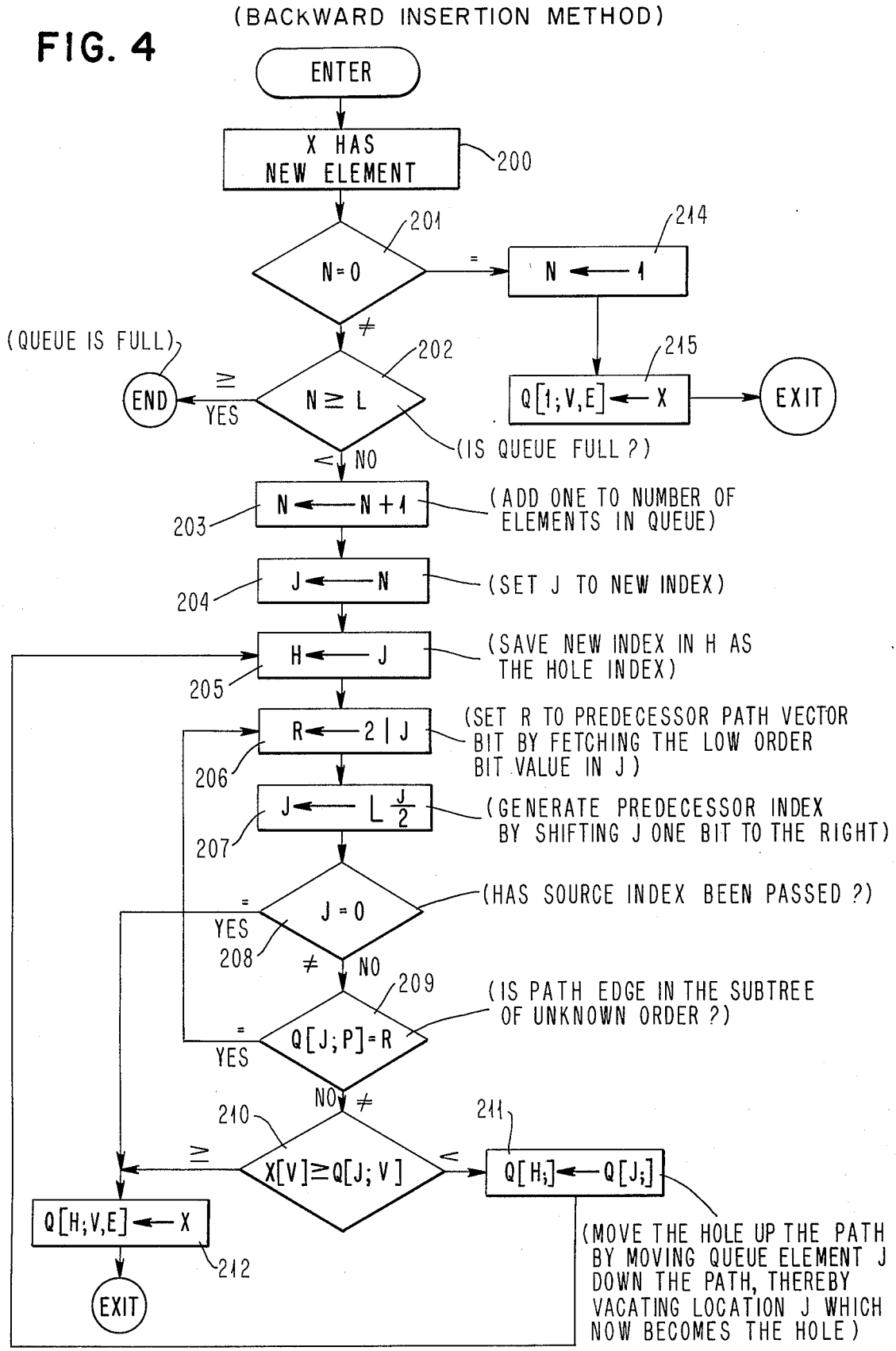
Figure 5:
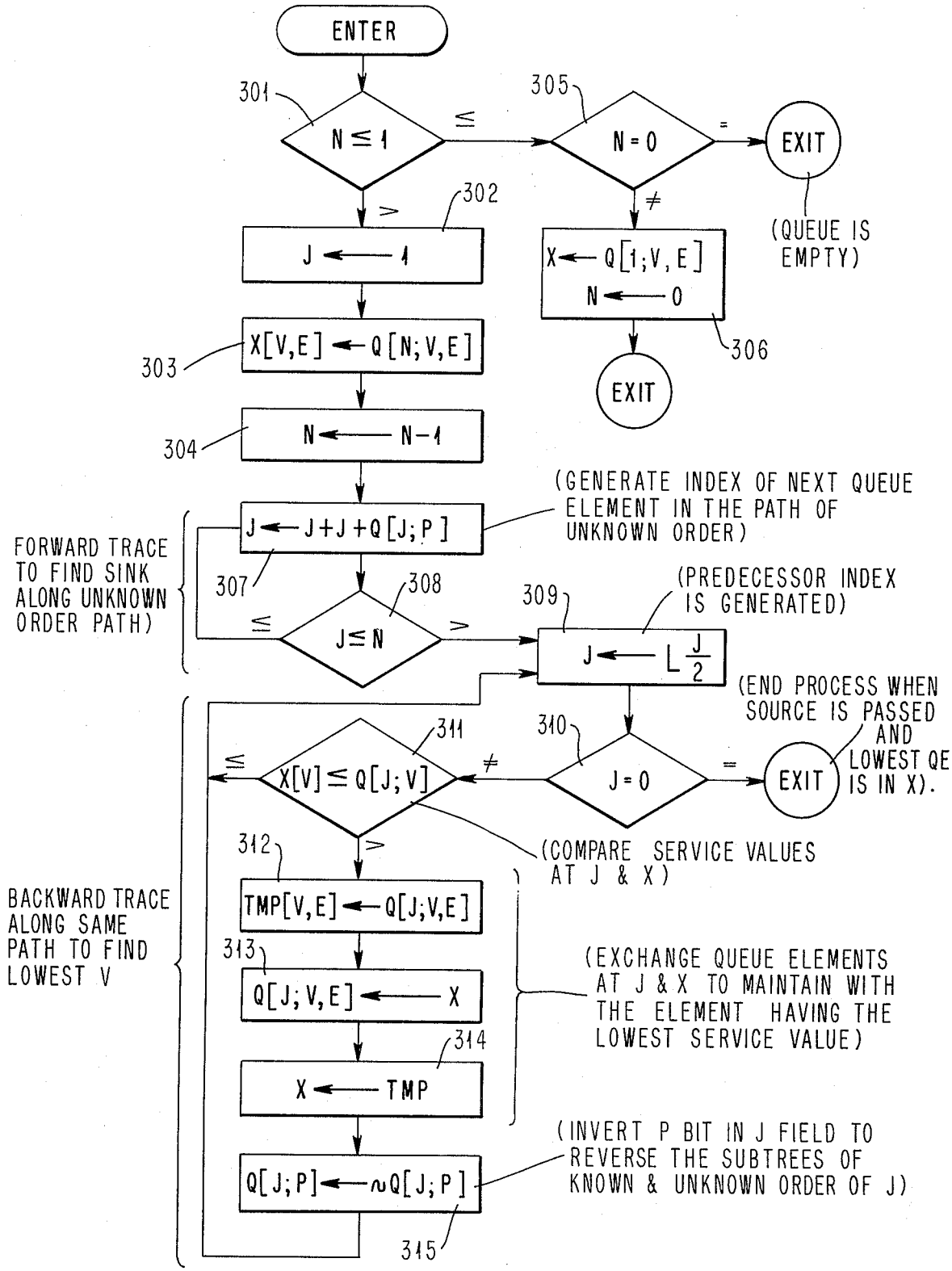
Figure 6:
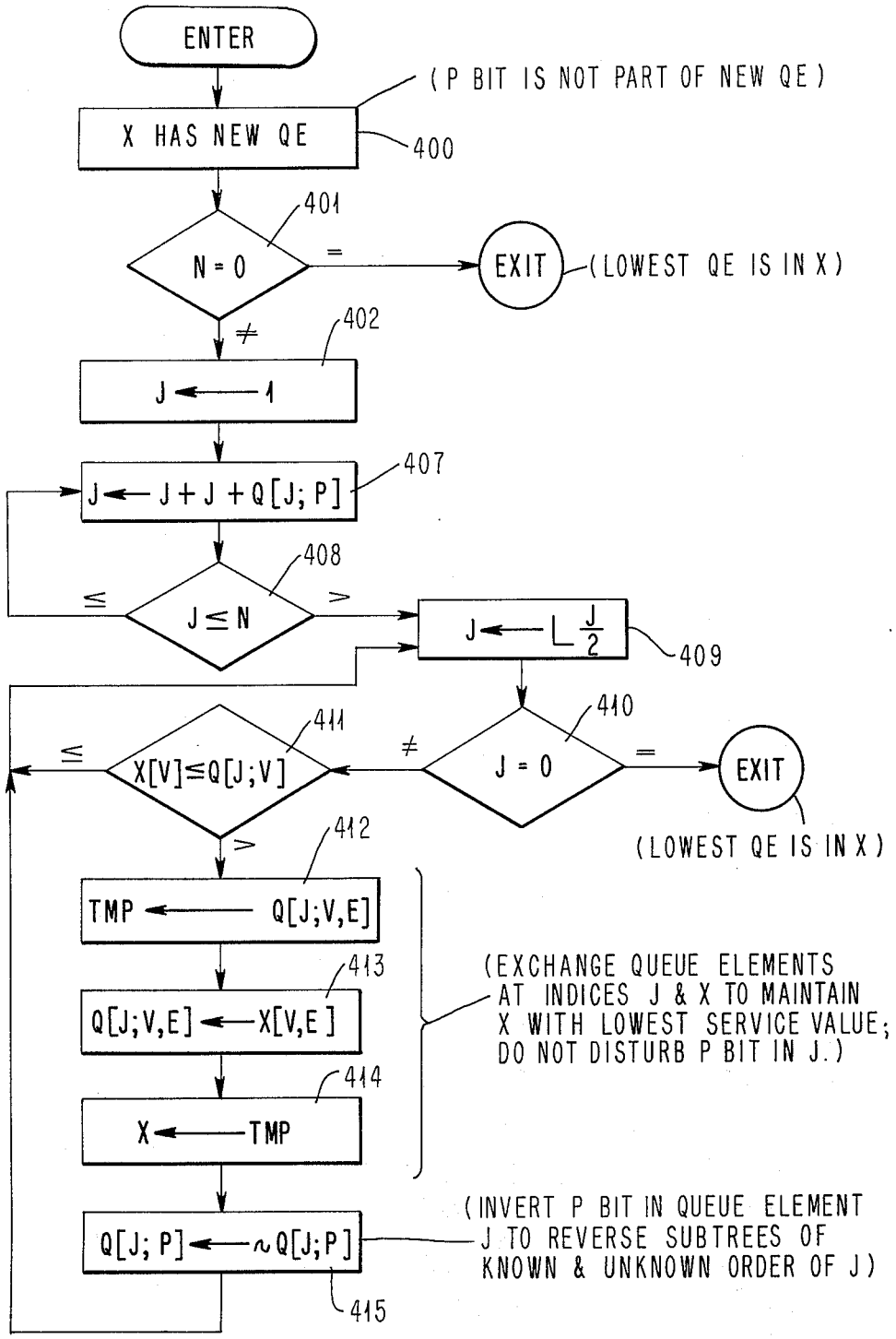
Figure 7:
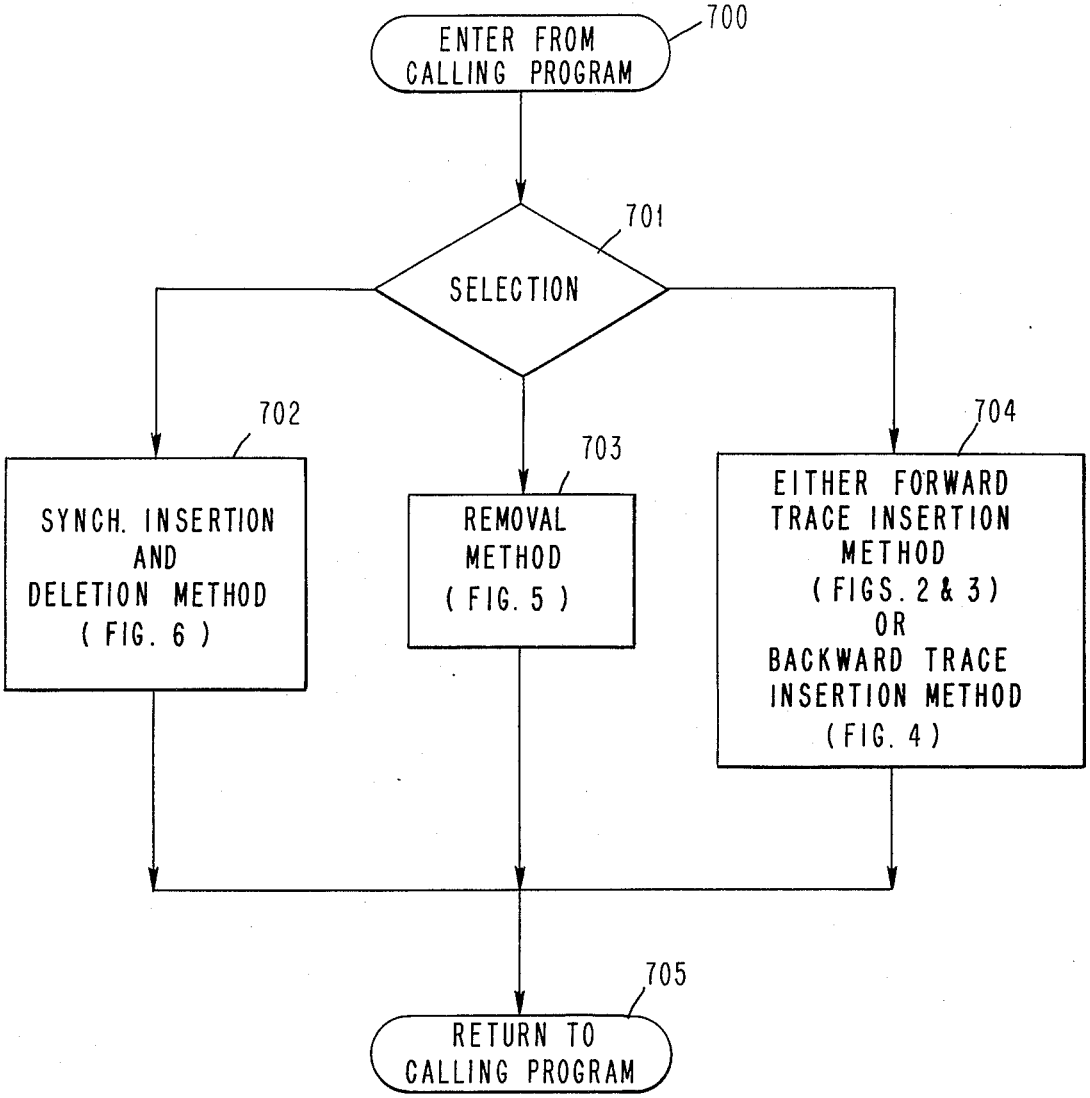

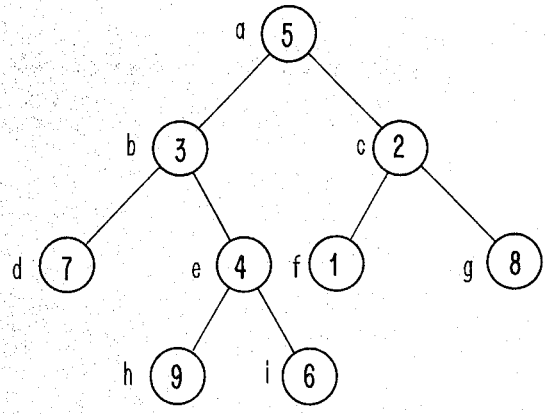
FIG. 0
FIG. 1A
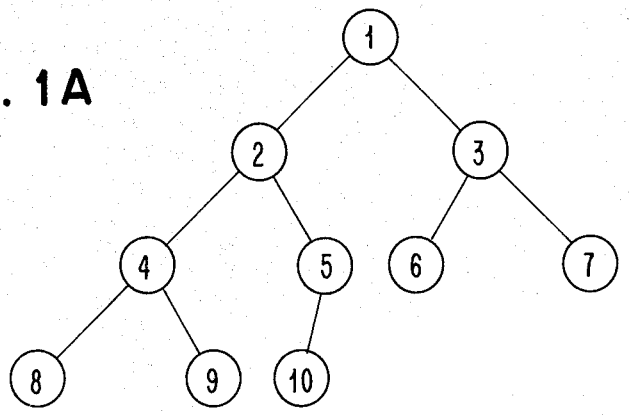
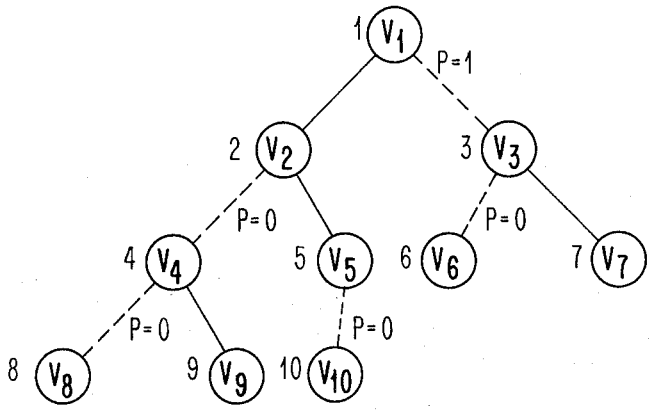
FIG. 1B

MATRIX Q

| INDICES | | | | | |
|---|---|---|---|---|---|
| (0001) | 1 | P1 | V1 | E1 |
| (0010) | 2 | P2 | V2 | E2 |
| (0011) | 3 | P3 | V3 | E3 |
| (0100) | 4 | P4 | V4 | E4 |
| (0101) | 5 | P5 | V5 | E5 |
| (0110) | 6 | P6 | V6 | E6 |
| (0111) | 7 | P7 | V7 | E7 |
| (1000) | 8 | P8 | V8 | E8 |
| (1001) | 9 | P9 | V9 | E9 |
| (1010) | 10 | P10 | V10 | E10 |
| (1011) | 11 | P11 | V11 | E11 |

| ROW IN Q MATRIX | PATH ORDER BIT (P) | QUEUE SERVICE VALUE (V) | QUEUE ITEM OR POINTER (E) |
|---|---|---|---|
| | ← 1 BIT → | ← 8 BITS → | ← 23 BITS → |

(FORWARD TRACE INSERTION METHOD) FIG. 2
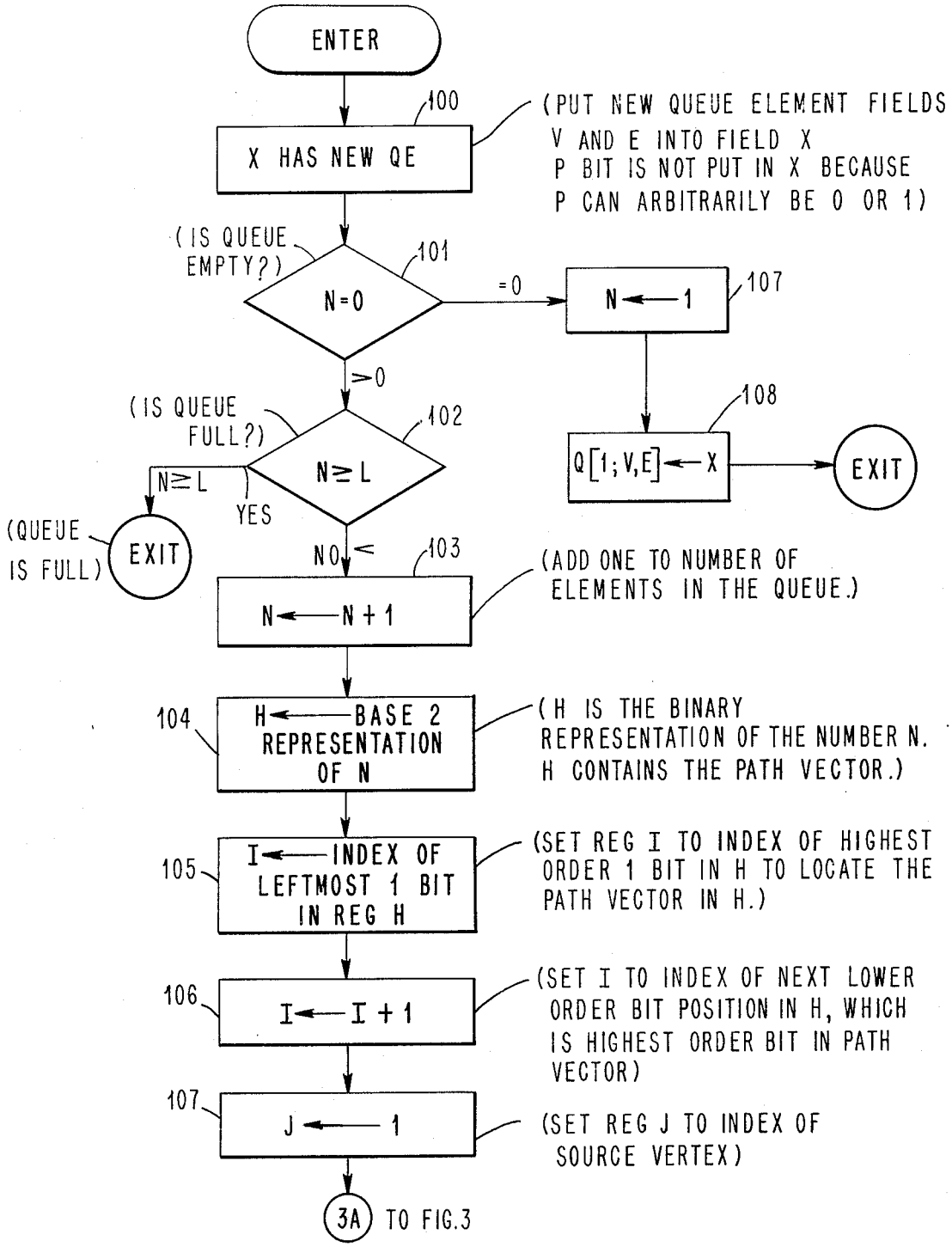

(FORWARD TRACE INSERTION METHOD CONTINUED)

FIG. 5 (METHOD OF REMOVAL OF LOWEST SERVICE VALUE)

FIG. 6 (SYNCHRONOUSLY ADDING & REMOVING QUEUE ELEMENTS)